(12) United States Patent
Kim et al.

(10) Patent No.: US 11,555,570 B2
(45) Date of Patent: Jan. 17, 2023

(54) CONNECTOR FOR SETTING LAYOUT OF BRAKE HOSE

(71) Applicant: HS R & A Co., Ltd., Gyeongsangnam-do (KR)

(72) Inventors: Byeong Ju Kim, Busan (KR); Jae Hyeok Choi, Gyeongsangnam-do (KR); Guk Hyun Kim, Gyeongsangnam-do (KR); Seung Hoon Sung, Busan (KR); Seung Hyo Lee, Gyeongsangnam-do (KR)

(73) Assignee: HS R & A CO., LTD., Gyeongsangnam-Do (KR)

( * ) Notice: Subject to any disclaimer, the term of this patent is extended or adjusted under 35 U.S.C. 154(b) by 198 days.

(21) Appl. No.: 17/143,786

(22) Filed: Jan. 7, 2021

(65) Prior Publication Data
US 2021/0215288 A1 Jul. 15, 2021
US 2022/0170579 A9 Jun. 2, 2022

(30) Foreign Application Priority Data

Jan. 13, 2020 (KR) .......... 10-2020-0004391

(51) Int. Cl.
*F16M 11/00* (2006.01)
*F16L 55/00* (2006.01)
(Continued)

(52) U.S. Cl.
CPC ............ *F16L 55/00* (2013.01); *B60T 17/043* (2013.01); *B60T 17/046* (2013.01); *G01B 5/14* (2013.01)

(58) Field of Classification Search
CPC ........... F16L 55/00; F16L 3/28; B60T 17/043; B60T 17/046; G01B 5/14
See application file for complete search history.

(56) References Cited

U.S. PATENT DOCUMENTS 4,194,711 A * 3/1980 Winton ............... F16L 3/26
248/83
5,215,280 A * 6/1993 Tigrett ............... H02G 9/065
D8/356
(Continued)

FOREIGN PATENT DOCUMENTS

DE   102015202481 A1   8/2015
KR   20-0318560 Y1     6/2003
(Continued)

OTHER PUBLICATIONS

Extended European Search Report (nine pages) dated Jun. 9, 2021 from corresponding European Application No. EP 20 21 7762.2.
(Continued)

*Primary Examiner* — Amy J. Sterling
(74) *Attorney, Agent, or Firm* — Crowell & Moring LLP; John C. Freeman

(57) ABSTRACT

In embodiments, a connector for setting a layout of a brake hose includes a first coupling member coupled to one end of the brake hose; a second coupling member disposed to be spaced apart from the first coupling member, and coupled to the caliper housing or the frame of the master cylinder; and an adjusting unit connected at one end thereof to the first coupling member, connected at other end thereof to the second coupling member, and configured to adjust a shortest length between a bottom surface of the first coupling member and an outer circumferential surface of the second coupling member and to adjust a line passing through a center of the first coupling member with respect to the second coupling member to be positioned in one of up/down/left/right directions, in a test for setting the layout of the brake hose.

7 Claims, 13 Drawing Sheets

(51) Int. Cl.
  *B60T 17/04* (2006.01)
  *G01B 5/14* (2006.01)

(56) References Cited

U.S. PATENT DOCUMENTS

| | | | | |
|---|---|---|---|---|
| 10,591,091 B1* | 3/2020 | Waszak | ............... | F16L 9/22 |
| 2005/0236888 A1* | 10/2005 | Corbin | ............... | B60T 17/043 |
| | | | | 303/7 |
| 2009/0095367 A1* | 4/2009 | Socha | ............... | B60T 17/043 |
| | | | | 138/34 |
| 2011/0095140 A1* | 4/2011 | Armit | ............... | E03F 5/022 |
| | | | | 248/68.1 |
| 2011/0290523 A1* | 12/2011 | Lacey, Jr. | ............... | H02G 3/0608 |
| | | | | 174/68.3 |
| 2013/0233659 A1* | 9/2013 | Moore | ............... | B62L 3/023 |
| | | | | 188/344 |
| 2014/0175230 A1* | 6/2014 | Lee | ............... | H02G 3/263 |
| | | | | 248/62 |
| 2014/0312182 A1* | 10/2014 | Nijdam | ............... | F16L 3/26 |
| | | | | 248/58 |
| 2015/0001842 A1* | 1/2015 | Jones | ............... | F16L 27/047 |
| | | | | 285/261 |
| 2015/0163955 A1* | 6/2015 | Larsen | ............... | F16L 3/26 |
| | | | | 248/51 |
| 2015/0250544 A1* | 9/2015 | Costargent | ............... | A61B 90/50 |
| | | | | 29/428 |
| 2016/0025245 A1* | 1/2016 | Schutte | ............... | F16L 1/06 |
| | | | | 52/741.1 |
| 2016/0069502 A1* | 3/2016 | Maciak | ............... | F16L 3/26 |
| | | | | 248/74.2 |
| 2016/0207517 A1 | 7/2016 | Heutchy | | |
| 2017/0305401 A1* | 10/2017 | Takenaka | ............... | F16D 65/0068 |
| 2019/0263372 A1* | 8/2019 | Normyle | ............... | B60T 15/041 |
| 2020/0001848 A1* | 1/2020 | Gaggero | ............... | F16D 51/30 |
| 2020/0266614 A1* | 8/2020 | Aelvoet | ............... | H02G 3/0456 |
| 2020/0278050 A1* | 9/2020 | Dodge | ............... | F16L 3/1218 |
| 2020/0300386 A1* | 9/2020 | Dodge | ............... | F16L 59/135 |
| 2021/0213926 A1* | 7/2021 | Kim | ............... | B60T 17/046 |
| 2021/0301959 A1* | 9/2021 | Stavros | ............... | F16L 33/223 |

FOREIGN PATENT DOCUMENTS

| | | |
|---|---|---|
| KR | 10-2015-0098695 A | 8/2015 |
| KR | 10-2017-0136744 A | 12/2017 |

OTHER PUBLICATIONS

Office Action dated Jan. 18, 2021 from corresponding Korean Patent Application No. 10-2020-0004390 (15 pages including English translation).

* cited by examiner

CONNECTOR FOR SETTING LAYOUT OF BRAKE HOSE

CROSS-REFERENCE TO RELATED APPLICATION(S)

This application is based on and claims priority under 35 U.S.C. § 119 to Korean Patent Application No. 10-2020-0004391, filed on Jan. 13, 2020, in the Korean Intellectual Property Office, the entire disclosure of which is herein incorporated by reference.

BACKGROUND OF THE INVENTION

Field of the Invention

The disclosure relates to a connector for setting a layout of a brake hose. More particularly, the disclosure relates to a layout setting connector capable of adjusting a layout of a brake hose in a test process of setting the layout of the brake hose.

Description of Related Art

In a vehicle braking system using hydraulic pressure, the hydraulic pressure is generated from a master cylinder responsive to the operation of a brake pedal, and when the hydraulic pressure is applied to a cylinder in a caliper housing through a brake pipe and a brake hose, a brake pad comes into contact with a disk to generate a braking force.

In case of a front axle of the vehicle, a wheel moves up and down depending on road surface conditions and moves left and right in response to steering of a steering wheel. Therefore, the brake hose supplying a brake oil should have flexibility so that it is varied in shape according to the movement of the wheel. For this reason, a rubber hose is mainly used as the brake hose.

The brake hose has to be installed stably without causing interference with other parts around it. Because the vehicle is directly connected to a driver's life, strict management of respective vehicle parts is required, and it is more important especially in the brake system.

FIG. 1 is a view showing connectors coupled to both ends of a brake hose generally applied to a vehicle in a well-known manner.

Referring to FIG. 1, the brake hose H is coupled at both ends to a first connector 30 and a second connector 40. The first connector 30 is connected to a frame (not shown) of a master cylinder through a bracket 20, and the second connector 40 is connected to a caliper housing (not shown) of the vehicle through a benzo bolt. In this way, the brake hose H can be disposed between the caliper housing and the frame.

Each of the connectors 30 and 40 should be configured in a specific shape to avoid interference between the brake hose H and surrounding parts. In particular, each of the connectors 30 and 40 is formed to be bent in a predetermined direction while having a predetermined length avoiding interference between the brake hose H and surrounding parts.

In general, a layout setting test is conducted so that the brake hose H can avoid interference with surrounding parts. A conventional test for setting the layout of the brake hose H is performed by actually installing the brake hose H in the vehicle through the connectors 30 and 40 when the design of the connectors 30 and 40 coupled to both ends of the brake hose H is completed. That is, the test is performed to check whether any interference occurs while driving between the brake hose H and the surrounding parts.

If the brake hose H interferes with the surrounding parts in the test for setting the layout of the brake hose H, the connectors 30 and 40 are removed from the vehicle and their lengths and bend directions are redesigned. Then, the redesigned connectors are mounted again in the vehicle and the test is repeated. Therefore, it takes a lot of time to set the layout of the brake hose H, and also the manufacturing cost is increased unnecessarily.

SUMMARY OF THE INVENTION

The disclosure provides a connector for setting a layout of a brake hose. The setting connector used to set the layout of the brake hose is implemented so that its length and bend direction can be adjusted. Therefore, using the setting connector makes it possible to accurately set the shape of a connector to be actually disposed in a vehicle while being coupled to the brake hose.

According to embodiments of the disclosure, a connector for setting a layout of a brake hose disposed between a caliper housing and a frame of a master cylinder in a vehicle may include a first coupling member coupled to one end of the brake hose; a second coupling member disposed to be spaced apart from the first coupling member, and coupled to the caliper housing or the frame of the master cylinder; and an adjusting unit connected at one end thereof to the first coupling member, connected at other end thereof to the second coupling member, and configured to adjust a shortest length between a bottom surface of the first coupling member and an outer circumferential surface of the second coupling member and to adjust a line passing through a center of the first coupling member with respect to the second coupling member to be positioned in one of up/down/left/right directions, in a test for setting the layout of the brake hose. In particular, the adjusting unit may include a length adjuster including a first length adjusting bar connected at one end thereof to the second coupling member, and a first tube body slidably coupled to other end of the first length adjusting bar; and a position adjuster including a first linking portion formed at other end of the first tube body, a second tube body connected at one end thereof to the first coupling member and having a bent portion at the other end thereof, and a second linking portion formed at an end of the bent portion and combined with or separated from the first linking portion.

BRIEF DESCRIPTION OF THE DRAWINGS

The above and other aspects, features and advantages of certain embodiments of the disclosure will be more apparent from the following detailed description, taken in conjunction with the accompanying drawings.

DETAILED DESCRIPTION

Figure 1:
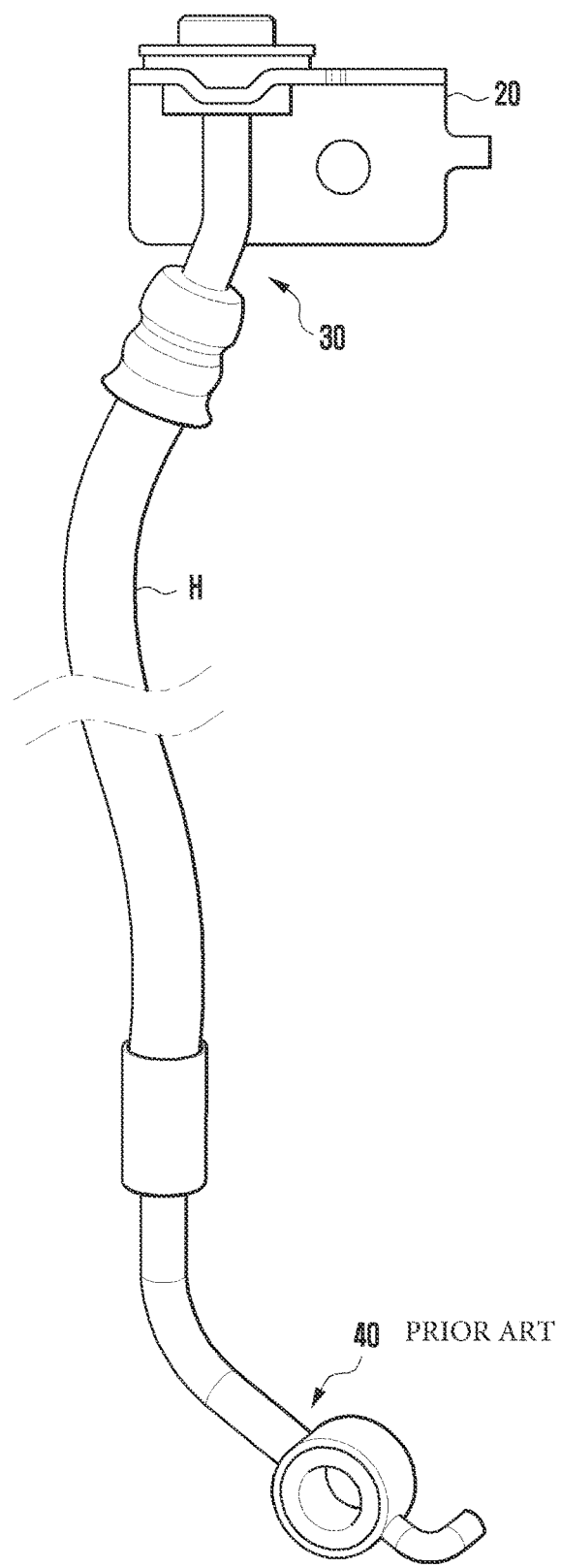
FIG. 1 is a view showing connectors coupled to both ends of a brake hose generally applied to a vehicle in a well-known manner.

Now, various embodiments of the disclosure will be described in detail with reference to the accompanying drawings. In the following description of embodiments, descriptions of techniques that are well known in the art and not directly related to the disclosure are omitted. This is to clearly convey the subject matter of the disclosure by omitting any unnecessary explanation. For the same reason, some elements in the drawings are exaggerated, omitted, or schematically illustrated. Also, the size of each element does not entirely reflect the actual size. In the drawings, the same or corresponding elements are denoted by the same reference numerals.

Hereinafter, a connector for setting a layout of a brake hose according to various embodiments of the disclosure will be described with reference to FIGS. 2 to 13.

Figure 2:
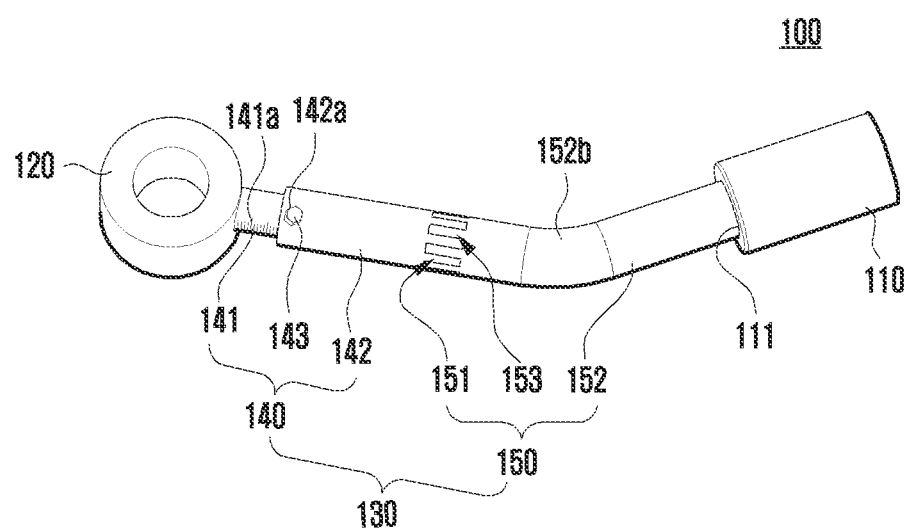
FIG. 2 is a perspective view showing a structure of a connector for setting according to a first embodiment of the disclosure.
Figure 3:
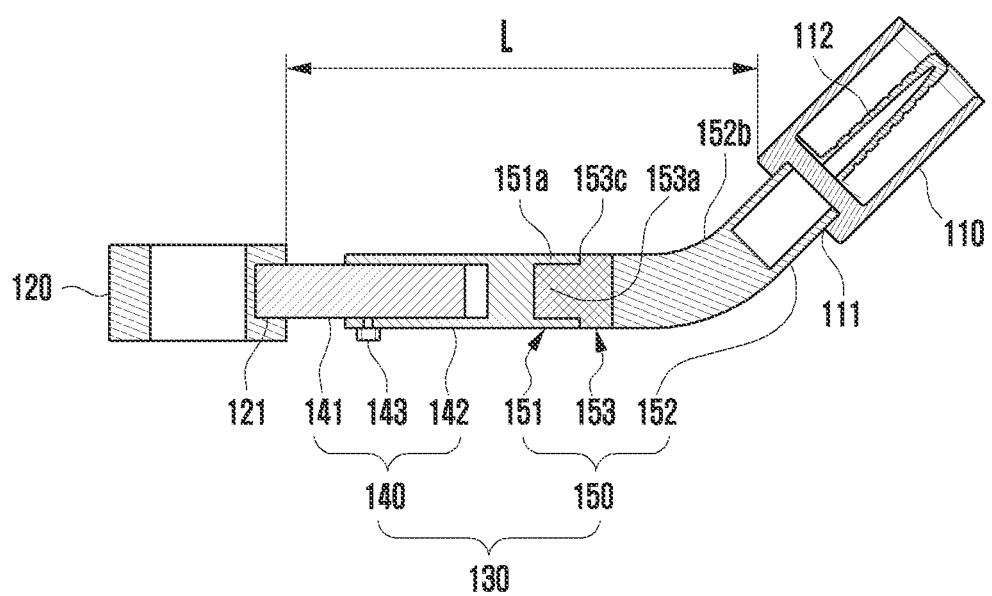
FIG. 3 is a cross-sectional view showing the structure of the setting connector according to the first embodiment of the disclosure.
Figure 4:
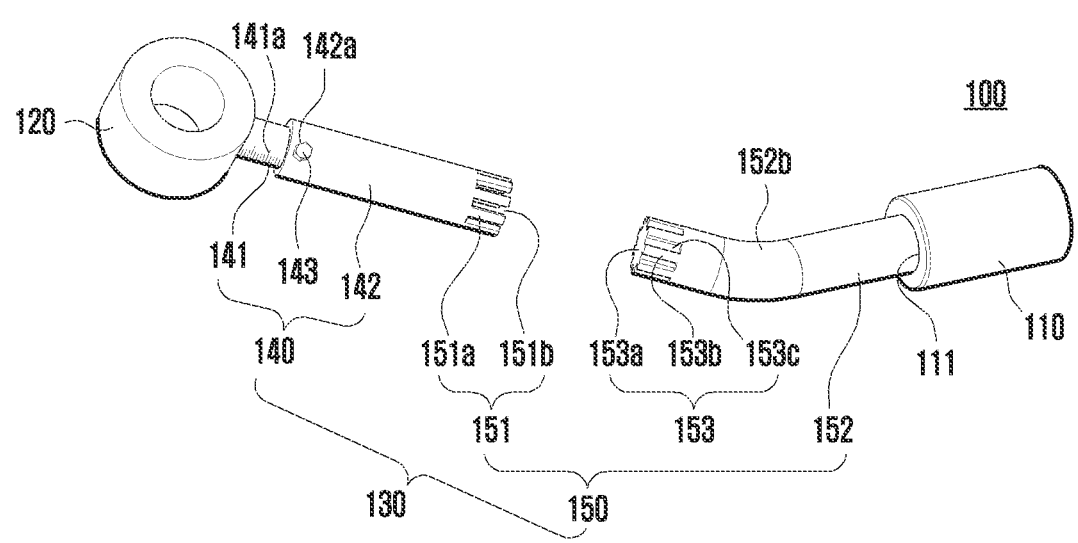
FIG. 4 is a perspective view showing a state in which first and second linking portions are separated from each other in order to adjust a bend direction of the setting connector according to the first embodiment of the disclosure.
Figure 5:
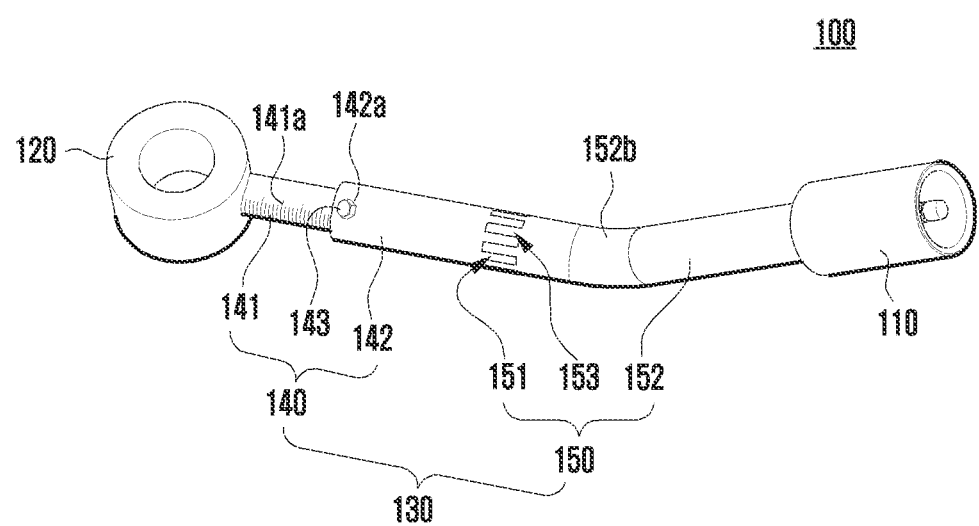
FIG. 5 is a perspective view showing an operating state of the setting connector according to the first embodiment of the disclosure.

FIG. 2 is a perspective view showing a structure of a connector for setting according to a first embodiment of the disclosure, and FIG. 3 is a cross-sectional view showing the structure of the setting connector according to the first embodiment of the disclosure. FIG. 4 is a perspective view showing a state in which first and second linking portions are separated from each other in order to adjust a bend direction of the setting connector according to the first embodiment of the disclosure, and FIG. 5 is a perspective view showing an operating state of the setting connector according to the first embodiment of the disclosure.

Referring to FIGS. 2 to 5, a setting connector 100 according to the first embodiment of the disclosure is used for setting the layout of a brake hose, especially, for accurately setting the shape of a real connector that connects one end of a brake hose (H, see FIG. 1) to one end of a caliper housing (10, see FIG. 11) or to a frame (not shown) of a master cylinder. The setting connector 100 may include a first coupling member 110, a second coupling member 120, and an adjusting unit 130.

The first coupling member 110 may be formed in a tubular shape and may have therein a coupling pin 112 coupled to one end of the brake hose H.

The one end of the brake hose H may be fitted inside the first coupling member 110, and the coupling pin 112 may be fitted inside the brake hose H.

In this state, when a clamping process is performed to compress the one end of the brake hose H and the first coupling member 110, the brake hose H and the first coupling member 110 may be coupled to each other. However, compression by the clamping process is exemplary only, and the coupling between the brake hose H and the first coupling member 110 is not limited thereto.

The second coupling member 120 connects the brake hose H, coupled to the first coupling member 110, to the caliper housing 10. The second coupling member 120 may be fixed to the caliper housing 10 by a separate fastening member (B, see FIG. 11).

The adjusting unit 130 may be disposed such that one end is connected to the first coupling member 110 and the other end is connected to the second coupling member 120.

In a test for setting the layout of the brake hose H, the adjusting unit 130 may adjust a length (L) between the first coupling member 110 and the second coupling member 120, for example, the shortest length (L) between the bottom surface of the first coupling member 110 and the outer circumferential surface of the second coupling member 120. In addition, the adjusting unit 130 may adjust a line passing through the center of the first coupling member 110 with respect to the second coupling member 120 to be positioned in one of up/down/left/right directions. The adjusting unit 130 may include a length adjuster 140 and a position adjuster 150.

The length adjuster 140 may include a first length adjusting bar 141 connected at one end thereof to the second coupling member 120, and a first tube body 142 slidably coupled to the other end of the first length adjusting bar 141.

Coupling between the first length adjusting bar 141 and the first tube body 142 may be made by a coupling force that allows the first tube body 142 to slide with respect to the first length adjusting bar 141 by an operator's manipulating force in a state where the first tube body 142 is fixed to the caliper housing 10. On the other hand, in the test for setting the layout of the brake hose H, a coupling state between the first length adjusting bar 141 and the first tube body 142 may be maintained through a first fixing member 143 to be described later.

One end of the first length adjusting bar 141 may be fixedly connected to the second coupling member 120. Thus, a first coupling recess 121 may be formed in the second coupling member 120 to accommodate the one end of the first length adjusting bar 141.

An operating example of the length adjuster 140 is shown in FIG. 5. In a state where the second coupling member 120 is coupled to the caliper housing 10, the first tube body 142 may slidingly move with respect to the first length adjusting bar 141 so as to adjust the overall length of the first length adjusting bar 141 and the first tube body 142. This allows adjusting the shortest length (L) between the bottom surface of the first coupling member 110 and the outer circumferential surface of the second coupling member 120.

In order to fix the adjusted overall length of the first length adjusting bar 141 and the first tube body 142 in the test for setting the layout of the brake hose H, the length adjuster 140 may further include a first fixing member 143 that passes through a surface of the first tube body 142 and fastens the first length adjusting bar 141 residing inside the first tube body 142. In this case, a first fastening hole 142a into which the first fixing member 143 is inserted may be formed in the surface of the first tube body 142.

Therefore, the overall length of the first length adjusting bar 141 and the first tube body 142 can be fixed, after adjusted, by the first fixing member 143 in the test for setting the layout of the brake hose H, so that it is possible to accurately set the length of a connector to be actually applied.

The position adjuster 150 may include a first linking portion 151, a second tube body 152, and a second linking portion 153. The linking portion 151 is formed at the other end of the first tube body 142. The second tube body 152 is connected at one end thereof to the first coupling member 110 and has a bent portion 152b at the other end thereof. The second linking portion 153 is formed at the end of the bent portion 152b of the second tube body 152 and combined with or separated from the first linking portion 151.

Referring to FIG. 4, the first linking portion 151 is composed of a plurality of first protrusions 151a protruded from the other end of the first tube body 142 and arranged at regular interval, and a plurality of first grooves 151b each formed between adjacent first protrusions 151a.

In addition, the second linking portion 153 is composed of a second linking portion body 153a protruded from the end of the bent portion 152b of the second tube body 152, a plurality of second protrusions 151b arranged at regular intervals on the outer circumferential surface of the second linking portion body 153a, and a plurality of second grooves 153c each formed between adjacent second protrusions 153b. The linking portion 153 is combined with the first linking portion 151 as will be described below in detail.

One end of the second tube body 152 may be fixedly connected to the first coupling member 110. Thus, a second coupling recess 111 may be formed in the first coupling member 110 to accommodate the one end of the second tube body 152.

Referring to FIGS. 4 and 5, an operating example of the position adjuster 150 is as follows. In a state where the second coupling member 120 is coupled to the caliper housing 10, the second linking portion 153 formed at the second pipe body 152 is separated from the first linking portion 151 formed at the first pipe body 142. Then, the second linking portion 153 is rotated with respect to the first linking portion 151 so as to adjust a bend direction of the bent portion 152b formed at the second tube body 152. Then, the first and second linking portions 151 and 153 are recombined. This allows adjusting a line passing through the center of the first coupling member 110 with respect to the second coupling member 120 to be positioned in one of up/down/left/right directions.

When the first and second linking portions 151 and 153 are combined or recombined with each other, the first protrusions 151a of the first linking portion 151 are inserted into the second grooves 153c of the second linking portion 153, and the second protrusions 153a of the second linking portion 153 are inserted into the first grooves 151b of the first linking portion 151. That is, the first protrusions 151a are fitted in the second grooves 153c while being in contact with the outer circumferential surface of the second linking portion body 153a.

As such, because the bend direction of the bent portion 152b of the second tube body 152 with respect to the first tube body 142 is adjusted, it is possible to adjust the line passing through the center of the first coupling member 110 with respect to the second coupling member 120 to be positioned in one of up/down/left/right directions.

The length adjuster 140 may further include a first scale indication 141a formed on the outer circumferential surface of the first length adjusting bar 141 in a longitudinal direction of the first length adjusting bar 141. The first scale indication 141a allows identifying a moving distance of the first tube body 142 with respect to the first length adjusting bar 141.

That is, the first scale indication 141a clearly indicates the moving distance of the first tube body 142 with respect to the first length adjusting bar 141, so that the operator can easily identify how long the shortest length between the bottom surface of the first coupling member 110 and the outer circumferential surface of the second coupling member 120 is adjusted by the length adjuster 140.

As described above, the layout setting connector 100 for the brake hose H according to the first embodiment of the disclosure is capable of adjusting the overall length of the first length adjusting bar 141 and the first tube body 142 and also adjusting the bend direction of the bent portion 152b formed at the second tube body 152. Consequently, the setting connector 100 is capable of not only adjusting the shortest length between the first coupling member 110 and the second coupling member 120, but also adjusting the line passing through the center of the first coupling member 110 with respect to the second coupling member 120 to be positioned in one of up/down/left/right directions.

Therefore, while repeatedly adjusting the length of the setting connector 100 and the bend direction of the bent portion 152b by using the adjusting unit 130 in the test for setting the layout of the brake hose H, it is possible to find the shape of a real connector that prevents interference between the brake hose H and surrounding parts. That is, by adjusting the length of the setting connector 100 and the bend direction of the bent portion 152b, it is possible to accurately set the shape of the connector actually installed in the vehicle.

Hereinafter, a connector for setting a layout of a brake hose according to a second embodiment of the disclosure will be described with reference to FIGS. 6 to 9.

Figure 6:
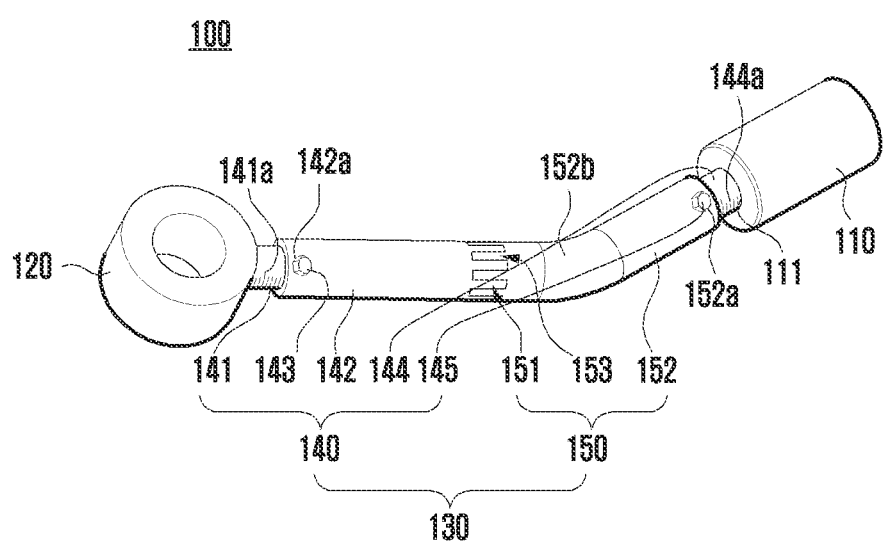
FIG. 6 is a perspective view showing a structure of a connector for setting according to a second embodiment of the disclosure.
Figure 7:
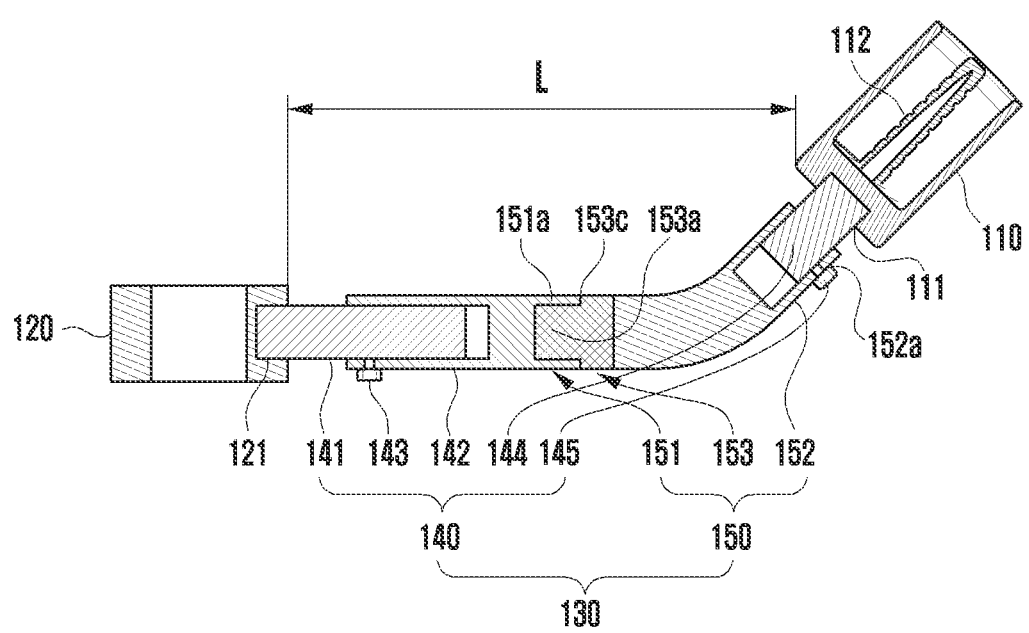
FIG. 7 is a cross-sectional view showing the structure of the setting connector according to the second embodiment of the disclosure.
Figure 8:
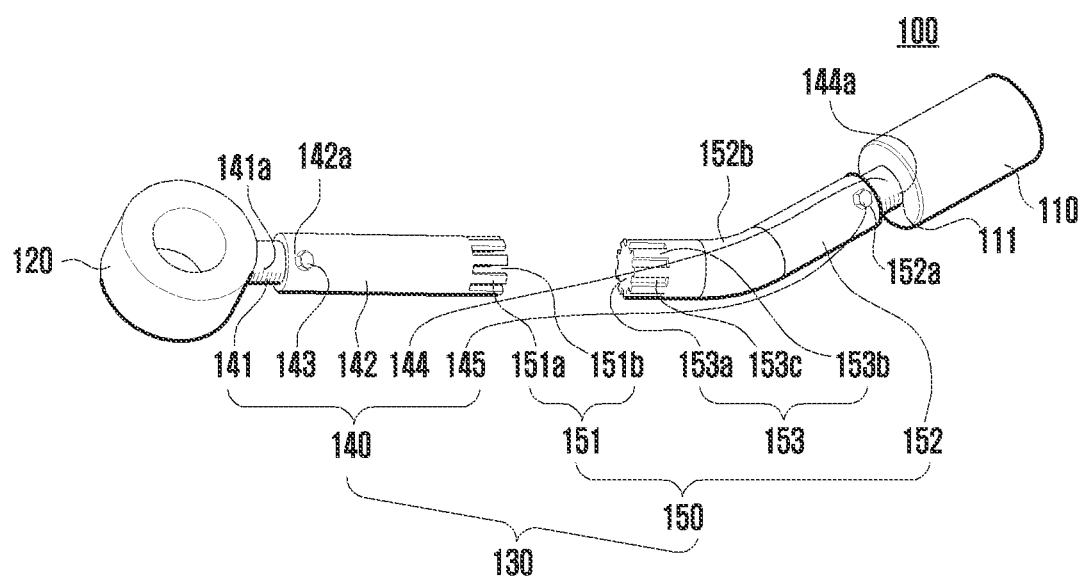
FIG. 8 is a perspective view showing a state in which first and second linking portions are separated from each other in order to adjust a bend direction of the setting connector according to the second embodiment of the disclosure.
Figure 9:
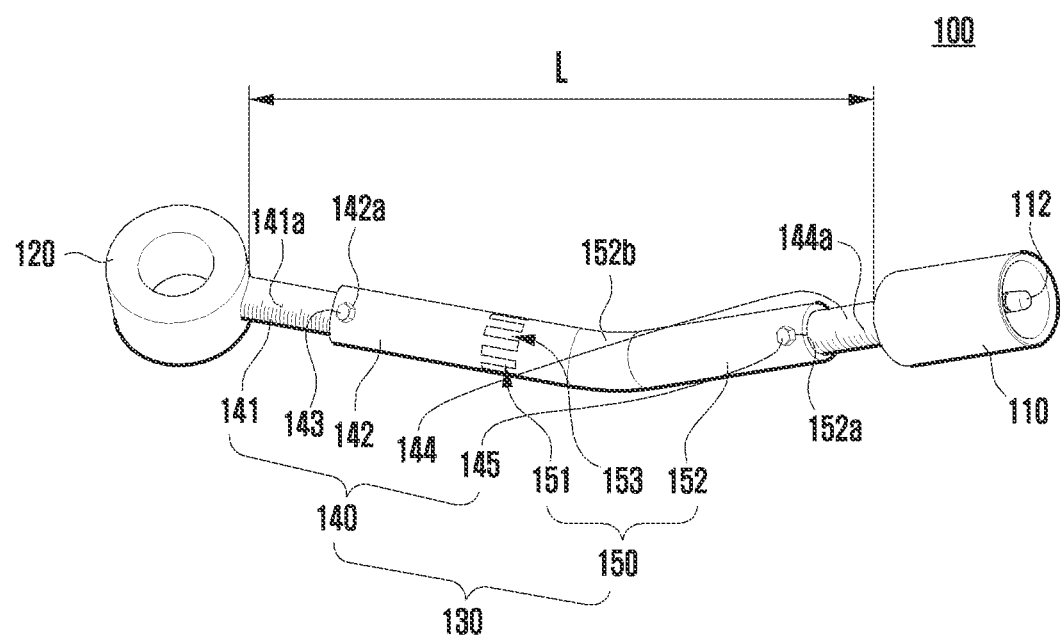
FIG. 9 is a perspective view showing an operating state of the setting connector according to the second embodiment of the disclosure.
Figure 10:
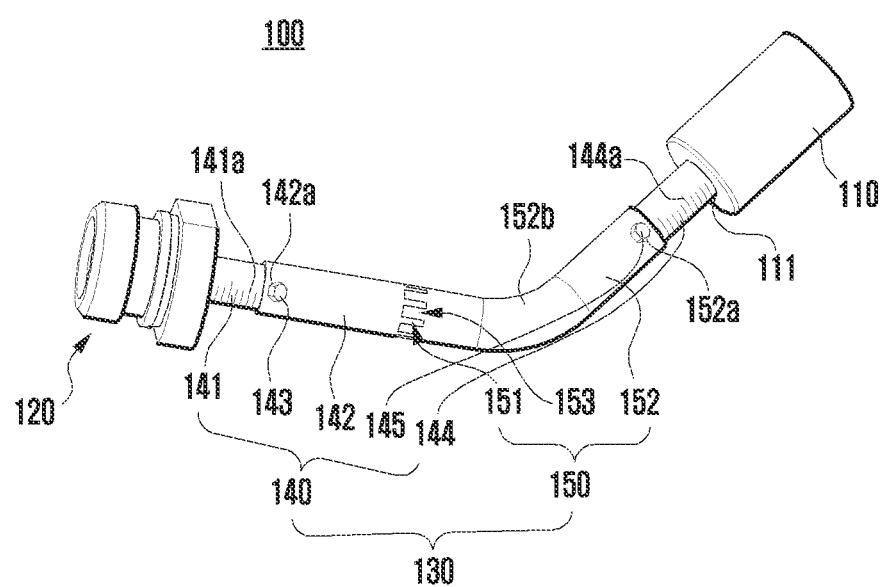
FIG. 10 is a perspective view showing another example of a second coupling portion of the setting connector according to the second embodiment of the disclosure.

FIG. 6 is a perspective view showing a structure of a connector for setting according to a second embodiment of the disclosure, and FIG. 7 is a cross-sectional view showing the structure of the setting connector according to the second embodiment of the disclosure. FIG. 8 is a perspective view showing a state in which first and second linking portions are separated from each other in order to adjust a bend direction of the setting connector according to the second embodiment of the disclosure. FIG. 9 is a perspective view showing an operating state of the setting connector according to the second embodiment of the disclosure, and FIG. 10 is a perspective view showing another example of a second coupling portion of the setting connector according to the second embodiment of the disclosure.

Referring to FIGS. 6 to 9, the connector 100 for setting the layout of the brake hose H according to the second embodiment has almost the same configuration as the above-described layout setting connector according to the first embodiment. However, the layout setting connector 100 according to the second embodiment is characterized in that the length adjuster 140 further includes a second length adjusting bar 144 which is slidably coupled to the other end of the second tube body 152 where the second linking portion 153 is formed.

Meanwhile, in the above-described first embodiment, one end of the second tube body 152 is fixedly connected to the first coupling member 110, but in the second embodiment, one end of the second length adjusting bar 144 is fixedly connected to the first coupling member 110.

According to the second embodiment, because the length adjuster 140 further includes the second length adjusting bar 144, the length adjustment is possible at both sides based on the position adjuster 150.

Specifically, in order to adjust a length between the first coupling member 110 and the second coupling member 120, that is, adjust the shortest length L between the bottom surface of the first coupling member 110 and the outer circumferential surface of the second coupling member 120, it is possible to not only slidingly move the first tube body 142 with respect to the first length adjusting bar 141, but also slidingly move the second length adjusting bar 144 with respect to the second tube body 152.

Also, in order to fix the adjusted overall length of the second tube body 152 and the second length adjusting bar 144 in the test for setting the layout of the brake hose H, the length adjuster 140 may further include a second fixing member 145 that passes through a surface of the second tube body 152 and fastens the second length adjusting bar 144 residing inside the second tube body 152. In this case, a second fastening hole 152a into which the second fixing member 145 is inserted may be formed in the surface of the second tube body 144.

In the second embodiment, the length adjuster 140 may further include a second scale indication 144a formed on the outer circumferential surface of the second length adjusting bar 144 in a longitudinal direction of the second length adjusting bar 144. The second scale indication 144a allows identifying a moving distance of the second length adjusting bar 144 with respect to the second tube body 152.

That is, the first scale indication 141a clearly indicates the moving distance of the first tube body 142 with respect to the first length adjusting bar 141, and the second scale indication 144a clearly indicates the moving distance of the second length adjusting bar 144 with respect to the second tube body 152. Therefore, the operator can easily identify how long the shortest length between the bottom surface of the first coupling member 110 and the outer circumferential surface of the second coupling member 120 is adjusted by the length adjuster 140.

Meanwhile, although in the first and second embodiments of the disclosure, the second coupling member 120 is implemented in a suitable shape for being fixed to the caliper housing 10, the second coupling member 120 may be implemented in a suitable shape for being coupled to the frame of the master cylinder. That is, as shown in FIG. 10, the second coupling member 120 may be implemented in the same shape as that of a second coupling member of the first connector 30 shown in FIG. 1, and the second coupling member 120 having this shape may be fixed to the frame through the bracket 20 shown in FIG. 1.

Figure 11:
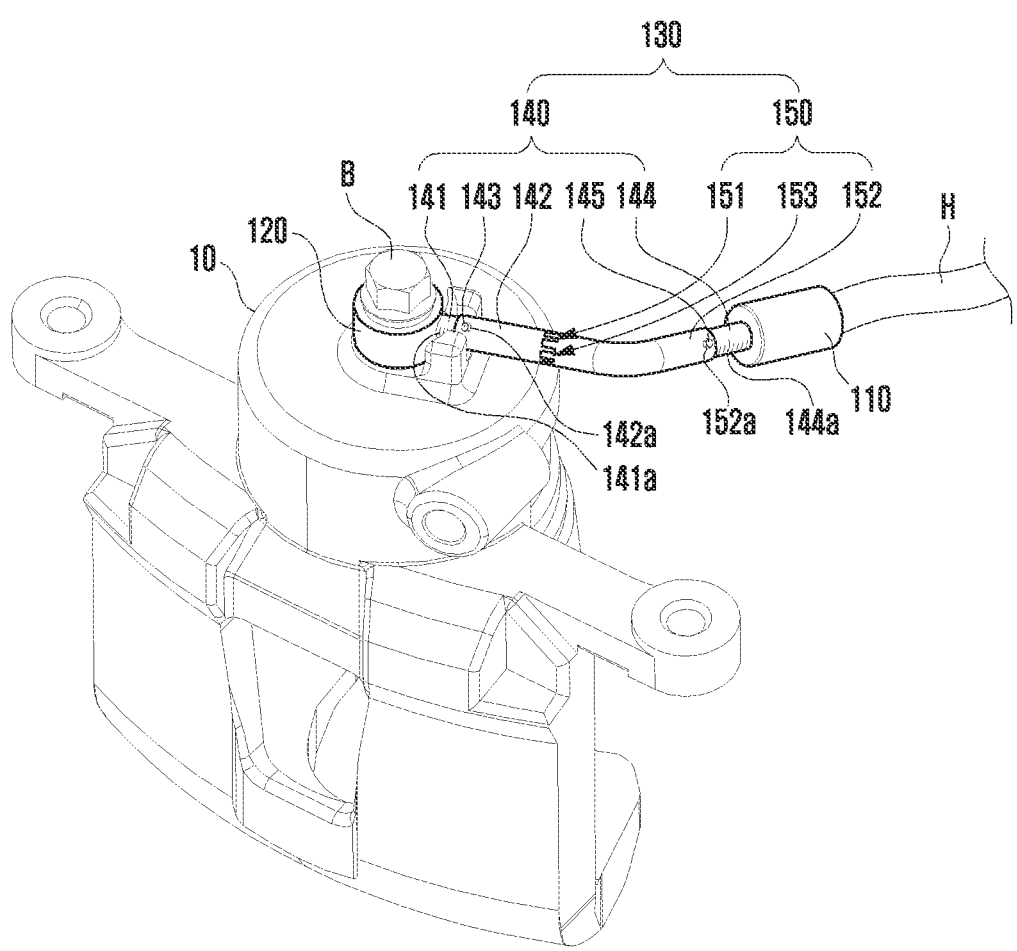
FIGS. 11 to 13 are views showing operations of the setting connector according to the second embodiment of the disclosure.

Hereinafter, operations of the connector for setting the layout of the brake hose according to the second embodiment of the disclosure will be described with reference to FIGS. 11 to 13. FIG. 11 shows a state in which the setting connector coupled at one end thereof to the brake hose is combined at the other end thereof with the caliper housing, FIG. 12 shows a state in which a second linking portion is separated from a first linking portion in order to adjust a bend direction of the setting connector, and FIG. 13 shows a state in which a second linking portion is recombined with a first linking portion after a bend direction of the setting connector is adjusted.

As shown in FIG. 11, in order to set the layout of the brake hose H, one end of the brake hose H is coupled to the first coupling member 110 of the setting connector 100, and also the second coupling member 120 of the setting connector 100 is coupled to the caliper housing 10. Also, the other end of the brake hose H is connected to the master cylinder (not shown) through another connector (not shown).

Next, as shown in FIG. 11, the shortest length (L) between the bottom surface of the first coupling member 110 and the outer peripheral surface of the second coupling member 120 is adjusted by slidingly moving the first tube body 142 with respect to the first length adjusting bar 141 and also slidingly moving the second length adjusting bar 144 with respect to the second tube body 152. After the shortest length (L) is adjusted, the first fixing member 143 and the second fixing member 145 are tightened so as to fix the adjusted length between the first and second coupling members 110 and 120.

Figure 12:
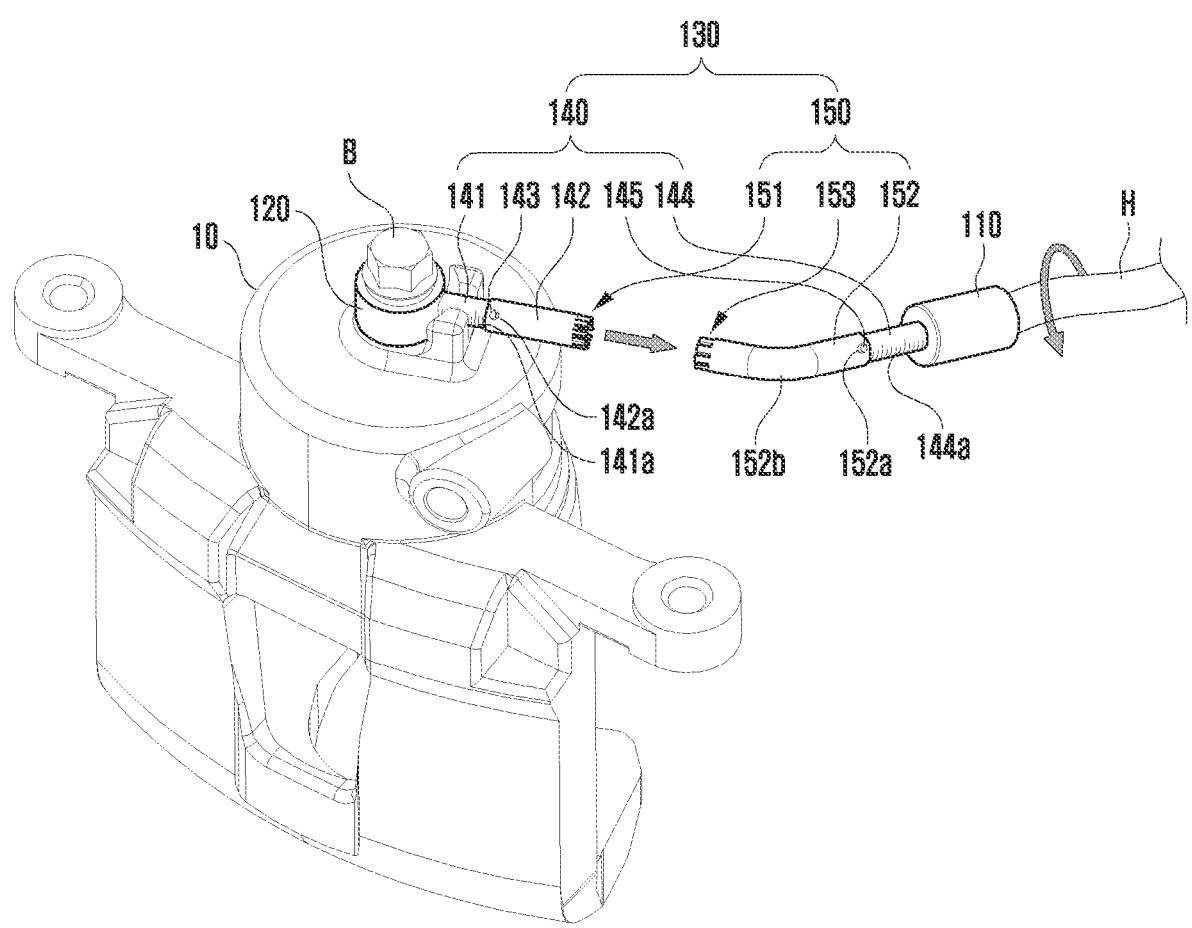
Figure 13:
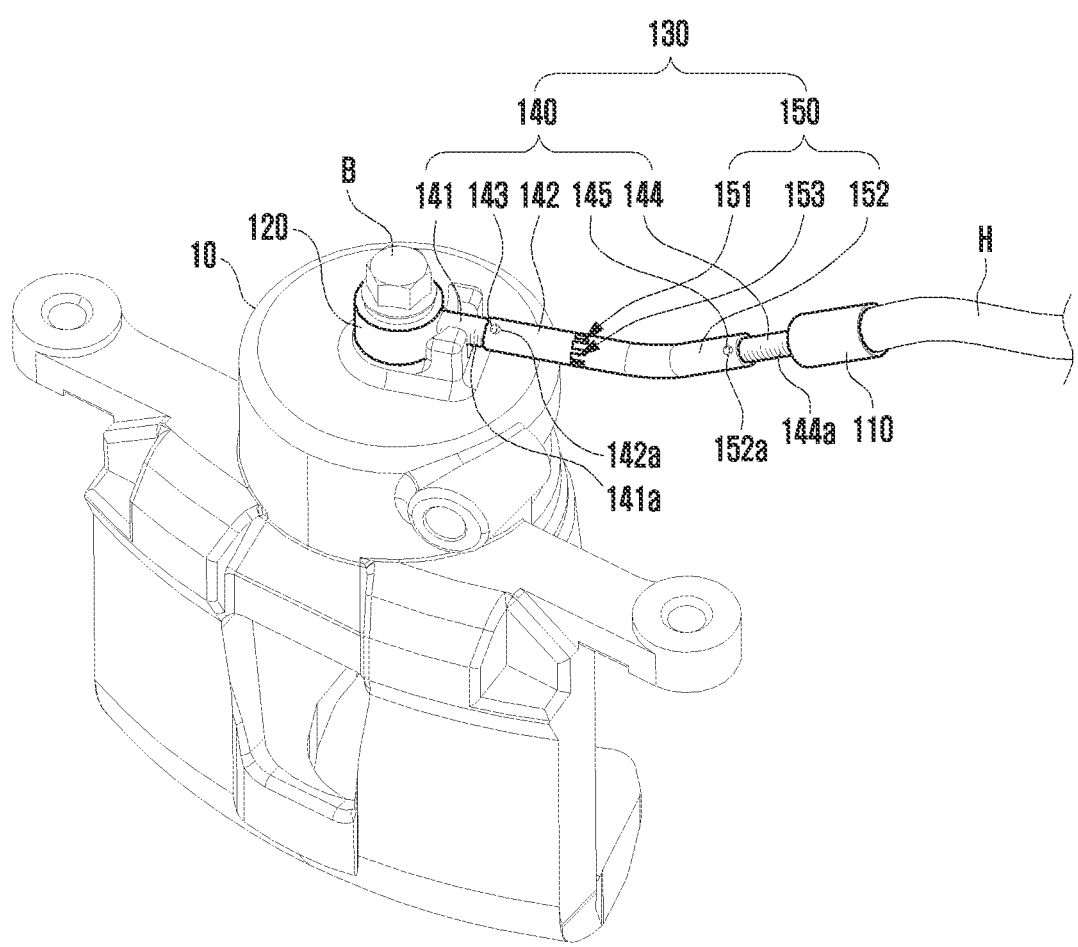

In addition, the second linking portion 153 is separated from the first linking portion 151 as shown in FIG. 12, and the bend direction of the bent portion 152b of the second tube body 152 is adjusted.

Then, as shown in FIG. 13, the second linking portion 153 is recombined with the first linking portion 151 such that the second tube body 152 having the adjusted bend direction of the bent portion 152b is connected to the first tube body 151.

In this state, the operator performs the test for setting the layout of the brake hose H. That is, while moving the suspension (not shown) up and down and steering the wheel (not shown) left and right, the operator checks whether the brake hose H causes interference with surrounding parts at the adjusted length and bend direction of the setting connector 100.

If interference occurs between the brake hose H and any surrounding part, the operator adjusts again the length and bend direction of the setting connector 100 in the adjusting unit 130.

By repeatedly performing the above process, a desired layout in which the brake hose H does not interfere with surrounding parts is set finally.

Next, based on the length and bend direction of the setting connector 100 in the finally set layout of the brake hose H, a connector that is actually disposed in a vehicle is manufactured.

As described above, by performing the test for setting the layout of the brake hose while adjusting the length and bend direction of the setting connector through the adjusting unit of the setting connector, it is possible to accurately set the layout of the connector to be actually installed in the vehicle.

While the disclosure has been particularly shown and described with reference to exemplary embodiments thereof, it will be understood by those skilled in the art that various changes in form and details may be made therein without departing from the scope of the subject matter as defined by the appended claims.

What is claimed is:

1. A connector for setting a layout of a brake hose disposed between a caliper housing and a frame of a master cylinder in a vehicle, the connector comprising:
   a first coupling member coupled to one end of the brake hose;
   a second coupling member disposed to be spaced apart from the first coupling member, and coupled to the caliper housing or the frame of the master cylinder; and
   an adjusting unit connected at one end thereof to the first coupling member, connected at an other end thereof to the second coupling member, and configured to adjust a shortest length between a bottom surface of the first coupling member and an outer circumferential surface of the second coupling member and to adjust a line passing through a center of the first coupling member with respect to the second coupling member to be positioned in one of up/down/left/right directions, in a test for setting the layout of the brake hose, wherein the adjusting unit comprises:

a length adjuster comprising a length adjusting bar connected at one end thereof to the second coupling member, and a first tube body slidably coupled to an other end of the length adjusting bar; and a position adjuster comprising a first linking portion formed at one end of the first tube body, a second tube body connected at one end thereof to the first coupling member and having a bent portion at an other end thereof, and a second linking portion formed at an end of the bent portion and combined with or separated from the first linking portion.

2. The layout setting connector of claim 1, wherein the shortest length is adjusted by slidingly moving the first tube body with respect to the length adjusting bar, and a bend direction of the bent portion is adjusted by separating the second linking portion from the first linking portion, rotating the second linking portion with respect to the first linking portion, and recombining the rotated second linking portion with the first linking portion.

3. The layout setting connector of claim 1, wherein the first linking portion comprises a plurality of first protrusions protruded from an other end of the first tube body and arranged at regular intervals, and a plurality of first grooves each formed between adjacent first protrusions, and wherein the second linking portion comprises a second linking portion body protruded from the end of the bent portion of the second tube body, a plurality of second protrusions arranged at regular intervals on an outer circumferential surface of the second linking portion body, and a plurality of second grooves each formed between adjacent second protrusions.

4. The layout setting connector of claim 1, wherein in order to fix the adjusted length, the length adjuster further comprises a fixing member that passes through a surface of the first tube body and fastens the length adjusting bar residing inside the first tube body.

5. The layout setting connector of claim 1, wherein the length adjuster further comprises a scale indication formed on an outer circumferential surface of the length adjusting bar in a longitudinal direction of the length adjusting bar so as to allow identifying a moving distance of the first tube body with respect to the length adjusting bar.

6. The layout setting connector of claim 1, wherein the length adjuster further comprises a second length adjusting bar slidably coupled to the other end of the second tube body where the second linking portion is formed.

7. The layout setting connector of claim 6, wherein the length adjuster further comprises a scale indication formed on an outer circumferential surface of the second length adjusting bar in a longitudinal direction of the second length adjusting bar so as to allow identifying a moving distance of the second length adjusting bar with respect to the second tube body.

\* \* \* \* \*